United States Patent [19]

Kesterman

[11] 4,208,033
[45] Jun. 17, 1980

[54] LOCKING DEVICE FOR A BALL VALVE

[75] Inventor: James E. Kesterman, Cincinnati, Ohio

[73] Assignee: Dover Corporation, New York, N.Y.

[21] Appl. No.: 927,060

[22] Filed: Jul. 24, 1978

[51] Int. Cl.² .............................................. F16K 35/00
[52] U.S. Cl. ..................................... 251/90; 251/95; 251/113; 137/385
[58] Field of Search ................... 137/315, 383, 385; 251/89, 90, 95, 101, 110, 111, 286, 287, 315, 113, 98

[56] References Cited

U.S. PATENT DOCUMENTS

| 867,571 | 10/1907 | Claus | 251/113 |
|---|---|---|---|
| 1,014,203 | 1/1912 | Bees | 137/315 |
| 1,145,278 | 7/1915 | Taylor | 137/385 |
| 1,236,815 | 8/1917 | Behan | 251/95 |
| 1,444,780 | 2/1923 | Davis | 251/113 |
| 2,035,747 | 3/1936 | Harris | 251/101 |
| 2,161,509 | 6/1939 | Farber | 137/385 |
| 3,648,970 | 3/1972 | Hartmann et al. | 137/385 |
| 3,865,130 | 2/1975 | Mullis | 137/385 |
| 3,960,168 | 6/1976 | Plympton | 137/385 |
| 3,976,095 | 8/1976 | Koch et al. | 137/385 |
| 4,093,178 | 6/1978 | Hughes | 251/110 |
| 4,126,023 | 11/1978 | Smith et al. | 251/110 |

Primary Examiner—Martin P. Schwadron
Assistant Examiner—G. L. Walton
Attorney, Agent, or Firm—Kinney & Schenk

[57] ABSTRACT

A locking device has a locking plate mounted on a ball valve housing and a hasp slidably mounted on the locking plate for movement into a position in which the hasp can engage the ball valve handle to prevent movement thereof irrespective of whether the handle is in the ball valve open position or the ball valve closed position. When the hasp is disposed to engage the handle, an opening in the hasp is aligned with an opening in the locking plate to receive a padlock for locking the hasp in the handle engaging position so that the handle cannot be turned to move the ball valve.

28 Claims, 8 Drawing Figures

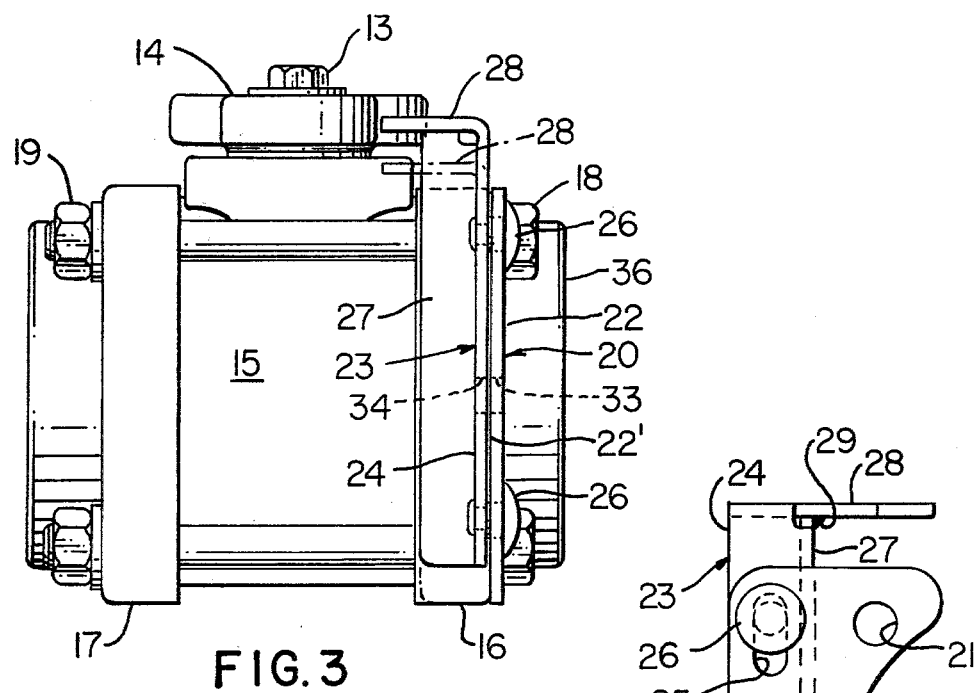
FIG. 3
FIG. 4
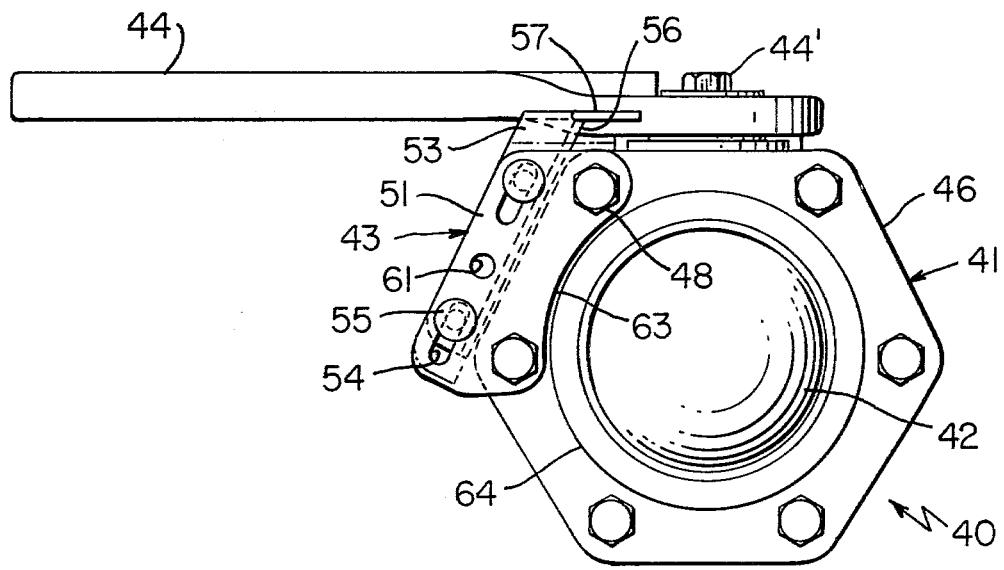
FIG. 5

LOCKING DEVICE FOR A BALL VALVE

The dispensing of liquid fertilizer from a tank is usually controlled by a ball valve. The ball valve can be disposed only in its open or closed position.

When the ball valve is moved to its open or closed position, it is desired that the ball valve be retained in this position. For example, when the ball valve is in its closed position, it is not desired for any inadvertent opening to occur through the handle being accidentally engaged and moved.

Furthermore, some storage tanks for liquid fertilizer are located in areas in which the ball valve handle can be turned by unauthorized persons. For example, a farmer could have the tank disposed in a location in which his children could unintentionally move the handle so as to move the ball valve to its open position when the children were playing. A substantial economic loss occurs in such a situation.

The present invention satisfactorily solves the foregoing problem through providing a locking device capable of locking the handle with the ball valve in either its open or closed position. Therefore, the locking device of the present invention prevents the handle from being turned from either of its two positions (the ball valve in its open position and the ball valve in its closed position) to its other position.

The locking device of the present invention is capable of being added to ball valves, which are already installed. It also can be utilized with a newly constructed ball valve.

The locking device of the present invention also does not interfere with movement of the handle when it is not desired to prevent movement of the handle. When it is not desired to prevent movement of the handle, the handle engaging portion of the locking device is disposed so that it does not interfere with the handle and the handle engaging portion assumes the unlocked position when it is not to prevent movement of the handle of the ball valve.

An object of this invention is to provide a locking device for a ball valve.

Another object of this invention is to provide a device for locking a ball valve in either its open or closed position.

Other objects, uses, and advantages of this invention are apparent upon a reading of this description, which proceeds with reference to the drawings forming part thereof and wherein:

FIG. 3 is a side elevational view of the ball valve and the locking device of FIGS. 1 and 2.

FIG. 4 is a front elevational view of the locking device of FIGS. 1-3.

FIG. 5 is an end elevational view of another form of the locking device of the present invention.

Figure 1:
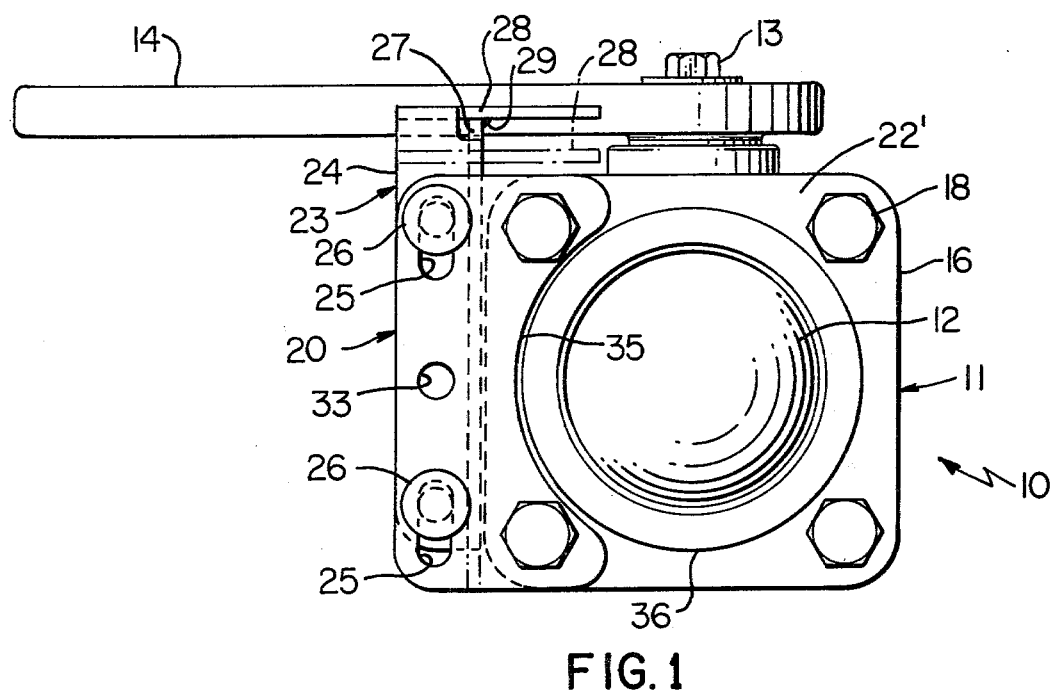
FIG. 1 is an end elevational view of a ball valve having one form of the locking device of the present invention.
Figure 2:
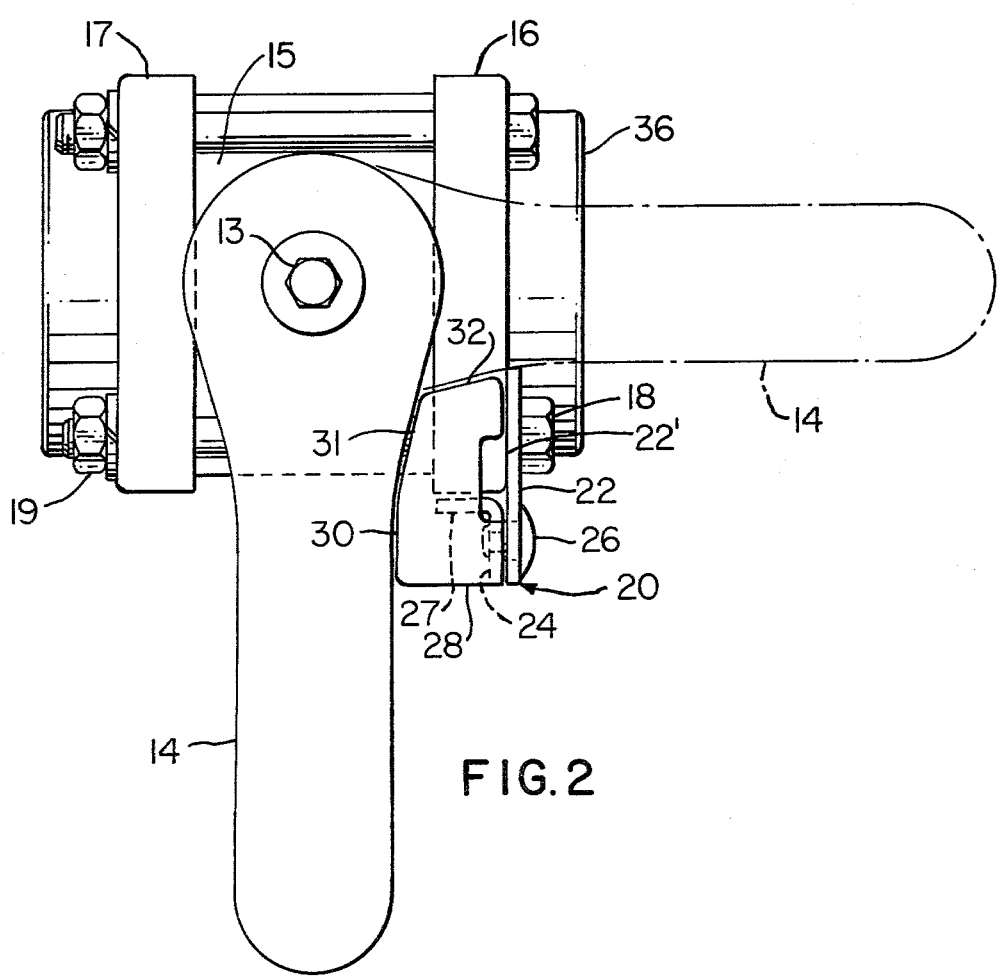
FIG. 2 is a top plan view of the ball valve of FIG. 1 with the locking device of the present invention and showing the handle in solid lines in the closed position of the ball valve and the handle in phantom lines in the open position of the ball valve.

Referring to the drawings and particularly FIGS. 1-3, there is shown a ball valve 10 having a housing 11 within which is disposed a ball 12 for blocking flow through the housing 11 when the ball 12 is in the position of FIG. 1 and allowing flow through the housing 11 when the ball 12, which is connected by a bolt 13 to a handle 14, is rotated by the handle 14 90° from the position of FIG. 1. The handle 14 is shown in phantom lines in the open position of the ball 12 in FIG. 2. The ball 12 has a passage (not shown) to allow flow through the housing 11.

The housing 11 includes a body 15 (see FIGS. 2 and 3) having rectangular shaped end caps 16 and 17 on each end thereof. The body 15 and the end caps 16 and 17 are joined to each other by bolts 18 and nuts 19.

A locking device 20 is mounted on the valve housing 11 through being secured to the end cap 16 by two of the bolts 18, which connect the body 15 and the end caps 16 and 17 to each other, passing through openings 21 (see FIG. 4) in a locking plate 22 of the locking device 20. The locking plate 22 bears against a surface 22' (see FIGS. 2 and 3) of the end cap 16.

The locking device 20 includes a hasp 23 slidably mounted on the locking plate 22. The hasp 23 includes a first portion 24, which is diposed substantially parallel to the locking plate 22 and slightly spaced therefrom as shown in FIGS. 2 and 3.

The locking plate 22 has pair of elongated slots 25 (see FIGS. 1 and 4) formed therein with a rivet 26 extending through each of the slots 25 and fixed to the first portion 24 of the hasp 23. Thus, the hasp 23 is slidably mounted on the locking plate 22 of the locking device 20 by the rivets 26 with the direction of movement of the hasp 23 being controlled by the direction of the slots 25.

The hasp 23 has a second portion 27 disposed substantially perpendicular to each of the first portion 24 of the hasp 23 and to the locking plate 22. The hasp 23 has a third portion 28, which is integral with the first portion 24 as shown in FIG. 3 and substantially perpendicular to both the first portion 24 and the second portion 27. The third portion 28 is welded to the second portion 27 at 29.

As shown in FIG. 2, the third portion 28 of the hasp 23 has surfaces 30 and 31, which are at an angle to each other, disposed to engage the handle 14 when the ball 12 is in the closed position (This is the solid line position of the handle 14 in FIG. 2.) if it is attempted to move the handle 14 counterclockwise. The third portion 28 has a surface 32 for engaging the handle 14 when the ball 12 is in the open position and it is attempted to move the handle 14 clockwise to move the ball 12 (See FIG. 1) to its closed position.

Accordingly, the locking device 20 has the surfaces 30 (see FIG. 2) and 31 of the third portion 28 of the hasp 23 engaging the handle 14 to lock the handle 14 in the closed position of the ball 12 and the surface 32 of the third portion 28 of the hasp 23 engaging the handle 14 to lock the handle 14 in the open position of the ball 12. When the hasp 23 is raised to the solid line position of FIGS. 1 and 3, either the surfaces 30 (see FIG. 2) and 31 of the third portion 28 of the hasp 23 or the surface 32 of the third portion 28 of the hasp 23 will engage the handle 14, if turning of the handle 14 is attempted, depending on the position of the handle 14 since the third portion 28 is in the plane of rotation of the handle 14.

When the third portion 28 of the hasp 23 is disposed in the solid line position of FIGS. 1 and 3, an opening 33 (see FIGS. 1, 3, and 4) in the locking plate 22 has an opening 34 (see FIG. 3) in the first portion 24 of the hasp 23 aligned therewith as shown in FIG. 3. The openings 33 and 34 cooperate to receive suitable means such as a padlock (not shown), for example, for locking the hasp 23 in the raised position in which the hasp 23 has the third portion 28 disposed so that the surfaces 30 (see FIG. 2) and 31 and the surface 32 are disposed to engage the handle 14 to prevent rotation thereof.

When the handle 14 is to be rotated, it is only necessary to remove the padlock from the openings 33 (see FIG. 3) and 34 and the hasp 23 falls by gravity when the locking device 20 is mounted as shown in FIGS. 1 and 4, to a position in which the third portion 28 of the hasp 23 is not disposed in the plane of rotation of the handle 14. This non-locking position of the hasp 23 is shown in phantom lines in FIGS. 1 and 3. It should be understood that the locking device 20 may be mounted so that the elongated slots 25 are not vertical whereby the hasp 23 has to be moved manually when the padlock is removed from the openings 33 and 34.

The locking plate 22 has an arcuate surface 35 (see FIGS. 1 and 4) on one side. This fits around a boss 36 (see FIG. 1) of the end cap 16 when the locking device 20 is mounted thereon.

Whenever it is desired to mount the locking device 20 on the ball valve 10 with the ball valve 10 already installed, it is necessary to first relieve the ball valve 10 of pressure and drain its contents. Then, two of the bolts 18 are completely removed. Next, the locking device 20 is mounted on the end cap 16 as shown in FIG. 1. Then, the bolts 18 are passed through the openings 21 (see FIG. 4) in the locking plate 22 to secure the locking device 20 to the ball valve housing 11 and to hold the body 15 and the end caps 16 and 17 in engagement with each other.

Figure 6:
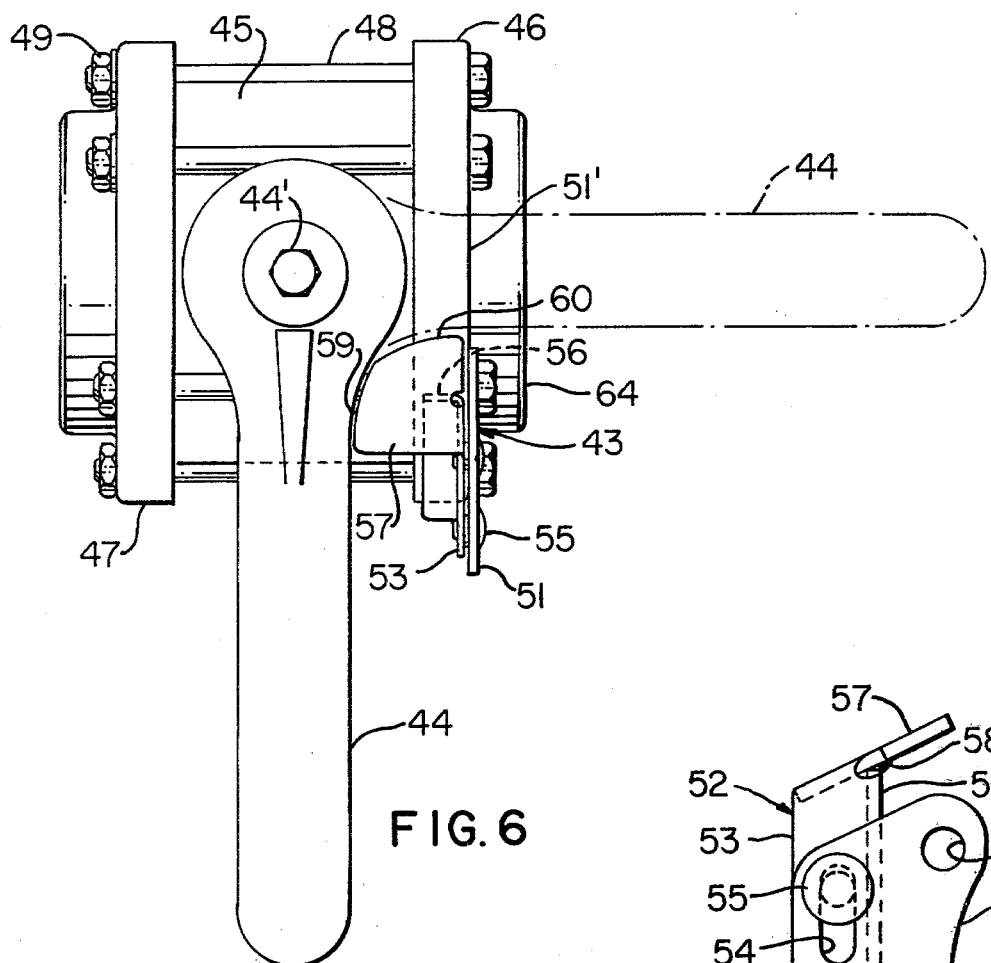
FIG. 6 is a top plan view of the ball valve of FIG. 5 with the locking device of the present invention and showing the handle in solid lines in the closed position of the ball valve and the handle in phantom lines in the open position of the ball valve.
Figure 7:
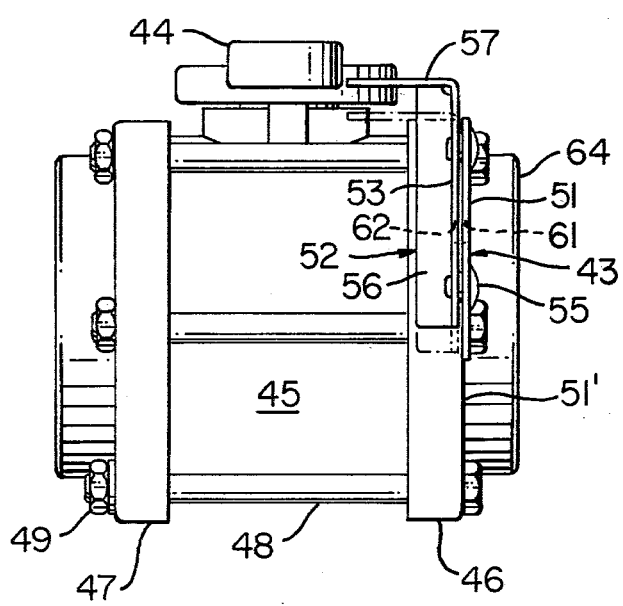
FIG. 7 is a side elevational view of the ball valve and the locking device of FIGS. 5 and 6.

Referring to FIGS. 5-7, there is shown a ball valve 40. The ball valve 40 includes a housing 41 having a ball 42 therein to control flow through the housing 41. The ball valve 40 has a locking device 43 for preventing movement of a handle 44, which is connected to the ball 42 by a bolt 44', from the solid line position of FIG. 6 in which the ball 42 is in its closed position and from the phantom line position of FIG. 6 in which the ball 42 is open to allow flow through the housing 41. The ball 42 has a passage (not shown) extending therethrough to allow flow through the housing 41 when the ball 42 is open.

The housing 41 includes a body 45 having hexagonal shaped end plates 46 and 47 on each end thereof. Bolts 48 and nuts 49 cooperate to secure the body 45 and the end plates 46 and 47 to each other.

Figure 8:
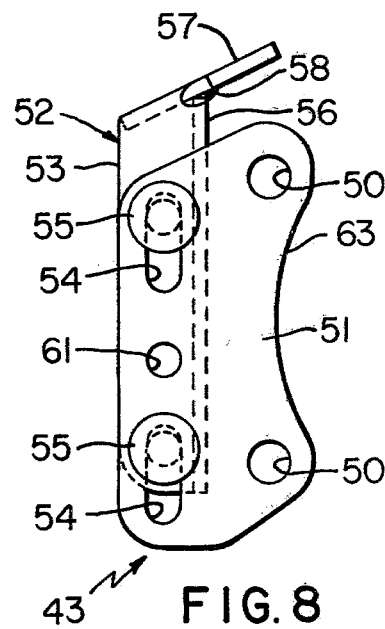
FIG. 8 is a front elevational view of the locking device of FIGS. 5-7.

The locking device 43 is secured to the housing 41 by two of the bolts 48 extending through a pair of openings 50 (see FIG. 8) in a locking plate 51. The locking plate 51 bears against a surface 51' (see FIGS. 6 and 7) of the end plate 46.

The locking device 43 has a hasp 52 slidably mounted on the locking plate 51 for movement between a position in which the hasp 52 blocks movement of the handle 44 from either of its positions of FIG. 6 to the other position and a position in which the hasp 52 does not block movement of the handle 44. The hasp 52 includes a first portion 53, which is disposed substantially parallel to the locking plate 51 and slightly spaced therefrom.

The locking plate 51 has a pair of elongated slots 54 (see FIGS. 5 and 8) therein through which rivets 55 extend. The rivets 55 are fixed to the first portion 53 of the hasp 52 so that the hasp 52 is slidably mounted by the rivets 55 on the locking plate 51 with the direction of movement of the hasp 52 being controlled by the direction of the slots 54.

The hasp 52 includes a second portion 56, which is substantially perpendicular to the first portion 53 of the hasp 52 and to the locking plate 51. The second portion 56 is integral with the first portion 53.

The hasp 52 includes a third portion 57 at the upper end of the first portion 53 and integral therewith. The third portion 57 is at an obtuse angle to the first portion 53 and the second portion 56. The third portion 57 is welded at 58 to the second portion 56 of the hasp 52.

As shown in FIG. 6, the third portion 57 has a surface 59 for engaging the handle 44 to prevent movement when the handle 44 is in the position in which the ball 42 is in its closed position. The third portion 57 of the hasp 52 has a surface 60, which cooperates with the handle 44 when the handle 44 is in the position in which the ball 42 is in its open position to prevent the handle 44 from being moved from this position.

When it is desired to prevent rotation of the handle 44, the third portion 57 of the hasp 52 is lifted to the solid line position of FIGS. 5 and 7 from the phantom line position. This positions the third portion 57 of the hasp 52 in the plane of rotation of the handle 44 to prevent rotation thereof. Thus, the handle 44 is prevented from moving from either of its positions to the other of its positions.

When the third portion 57 of the hasp 52 has been moved into the plane of rotation of the handle 44, an opening 61 (see FIGS. 5, 7, and 8) in the locking plate 51 of the locking device 43 is aligned with an opening 62 (see FIG. 7) in the first portion 53 of the hasp 52 as shown in FIG. 7. When the openings 61 and 62 are aligned with each other, suitable means such as a padlock (not shown), for example, can be passed therethrough to lock the hasp 52 in the position in which the third portion 57 of the hasp 52 is in the plane of rotation of the handle 44.

When the padlock is removed from the openings 61 and 62, the hasp 52 falls downwardly by gravity so that the third portion 57 of the hasp 52 is no longer in the plane of rotation of the handle 44. Instead, the third portion 57 of the hasp 52 moves to the phantom line position of FIGS. 5 and 7 where it is disposed beneath the plane of rotation of the handle 44.

The locking plate 51 has an arcuate surface 63 (see FIGS. 5 and 8) for cooperation with a boss 64 as shown in FIG. 5. Because the end plate 46 of the housing 41 is hexagonal shaped, the elongated slots 54 are disposed at an angle to the vertical rather than being vertical as are the elongated slots 25 in the locking plate 22 of the locking device 20 of FIGS. 1-4. Thus, the movement of the hasp 52 is at an angle to the vertical rather than vertical as the hasp 23 of the locking device 20 moves. As previously mentioned, it should be understood that the locking device 20 does not have to be disposed so that the elongated slots 25 are vertical.

An advantage of this invention is that it prevents inadvertent movement of a ball valve from either its open or closed position to the other position by disposing the locking means in a single position. Another advantage of this invention is that it prevents tampering with the position of a ball valve.

For purposes of exemplification, particular embodiments of the invention have been shown and described according to the best present understanding thereof. However, it will be apparent that changes and modifications in the arrangement and construction of the parts thereof may be resorted to without departing from the spirit and scope of the invention.

What is claimed is:

1. In combination, a valve housing, a valve element mounted in said valve housing and movable between an open position and a closed position, movable means connected to said valve element to move said valve element between its open and closed positions, locking means supported solely by said valve housing, and said locking means including means mounted for movement between a single position in which said mounted means of said locking means can prevent movement of said movable means from either its position when said valve element is in its open position or from its position when said valve element is in its closed position to selectively lock said movable means in the position in which said valve element is in its open position and in the position in which said valve element is in its closed position and a position in which said mounted means of said locking means cannot prevent movement of said movable means.

2. In combination, a valve housing, a valve element mounted in said valve housing and disposable in open and closed positions, movable means connected to said valve element to move said valve element, between its open and closed positions, locking means supported by said valve housing to selectively lock said movable means in the position in which said ball valve is in its open position and in the position in which said ball valve is in its closed position, and said locking means including first means supported by said valve housing, second means solely supported by said first means and movable between a position in which said second means prevents movement of said movable means irrespective of whether said valve element is in its open or closed position and a position in which said second means cannot prevent movement of said movable means, said second means normally being disposed in a position in which said second means cannot prevent movement of said movable means, and each of said first means and said second means having cooperating means cooperating with each other to receive means to hold said second means in the position in which said second means prevents movement of said movable means.

3. The combination according to claim 2 including means to slidably support said second means of said locking means on said first means of said locking means.

4. The combination according to claim 3 in which said second means of said locking means includes a first portion slidably supported on said first means of said locking means and a second portion cooperating with said movable means to prevent movement thereof, and said first portion having said cooperating means of said second means.

5. The combination according to claim 4 in which said cooperating means of said first means of said locking means includes an opening in said means and said cooperating means of said second means of said locking means includes an opening in said first portion of said second means aligned with said opening in said first means when said second portion of said second means is disposed to prevent movement of said movable means.

6. The combination according to claim 5 in which said second portion of said second means of said locking means is substantially perpendicular to said first portion of said second means of said locking means.

7. The combination according to claim 6 in which said slidably supporting means includes at least two elongated slots in said first means of said locking means and means extending through said slots and secured to said first portion of said second means of said locking means to enable sliding movement of said second means with respect to said first means, and said elongated slots being disposed to control the direction of movement of said second means between the position in which said second means can not prevent movement of said movable means and the position in which said second means prevents movement of said movable means.

8. The combination according to claim 5 in which said slidably supporting means includes at least two elongated slots in said first means of said locking means and means extending through said slots and secured to said first portion of said second means of said locking means to enable sliding movement of said second means with respect to said first means, and said elongated slots being disposed to control the direction of movement of said second means between the position in which said second means can not prevent movement of said movable means and the position in which said second means prevents movement of said moveable means.

9. The combination according to claim 3 in which said slidably supporting means includes at least two elongated slots in said first means of said locking means and means extending through each of said slots and secured to said second means of said locking means to enable sliding movement of said second means with respect to said first means, and said elongated slots are disposed to control the direction of movement of said second means between the position in which said second means can not prevent movement of said movable means and the position in which said second means prevents movement of said movable means.

10. The combination according to claim 1 in which said movable means is rotatable in a plane to move said valve element between its open and closed positions, and said mounted means of said locking means is movable from a position not in the plane of rotation of said movable means when said valve element is in its open or closed position into the plane of rotation of said movable means to be in the single position to prevent movement of said movable means from either of its positions in which said valve element is in its open or closed position.

11. The combination according to claim 2 including means to slidably support said second means of said locking means on said first means of said locking means for movement independently of said movable means.

12. The combination according to claim 2 including means to slidably support said second means of said locking means on said first means of said locking means for movement of said second means of said locking means in a direction substantially parallel to the axis of rotation of said movable means.

13. The combination according to claim 4 in which said second portion of said second means of said locking means cooperates only with said movable means to prevent movement of said movable means.

14. The combination according to claim 6 in which said second portion of said second means of said locking means is fixed to said first portion of said second means of said locking means.

15. In combination, a valve element housing, a valve element mounted in said valve element housing, movable means connected to said valve element to move said valve element between first and second positions, locking means supported solely by said valve housing, and said locking means including means mounted for movement between a single position in which said mounted means of said locking means can prevent movement of said valve element from either its first position when said valve element is in its first position or from its second position when said valve element is in its second position to selectively lock said movable means in the position in which said valve element is in its first position and in the position in which said valve element is in its second position and a position in which said mounted means of said locking means cannot prevent movement of said movable means.

16. In combination, a valve housing, a valve element mounted in said valve housing, movable means connected to said valve element to move said valve between first and second positions, locking means supported by said valve housing to selectively lock said movable means in the position in which said valve element is in its first position and in the position in which said valve element is in its second position, and said locking means including first means supported by said valve housing, second means solely supported by said first means and movable between a position in which said second means prevents movement of said movable means irrespective of whether said valve element is in its first or second position and a position in which said second means cannot prevent movement of said movable means, said second means normally being disposed in a position in which said second means cannot prevent movement of said movable means, and each of said first means and said second means having cooperating means cooperating with each other to receive means to hold said second means in the position in which said second means prevents movement of said movable means.

17. The combination according to claim 16 including means to slidably support said second means of said locking means on said first means of said locking means.

18. The combination according to claim 17 in which said second means of said locking means includes a first portion slidably supported on said first means of said locking means and a second portion cooperating with said movable means to prevent movement thereof, and said first portion having said cooperating means of said second means.

19. The combination according to claim 18 in which said cooperating means of said first means of said locking means includes an opening in said first means and said cooperating means of said second means of said locking means includes an opening in said first portion of said second means aligned with said opening in said first means when said second portion of said second means is disposed to prevent movement of said movable means.

20. The combination according to claim 19 in which said second portion of said second means of said locking means if substantially perpendicular to said first portion of said second means of said locking means.

21. The combination according to claim 20 in which said slidably supporting means includes at least two elongated slots in said first means of said locking means and means extending through said slots and secured to said first portion of said second means of said locking means to enable sliding movement of said second means with respect to said first means, and said elongated slots being disposed to control the direction of movement of said second means between the position in which said second means cannot prevent movement of said movable means and the position in which said second means prevents movement of said movable means.

22. The combination according to claim 19 in which said slidably supporting means includes at least two elongated slots in said first means of said locking means and means extending through said slots and secured to said first portion of said second means of said locking means to enable sliding movement of said second means with respect to said first means, and said elongated slots being disposed to control the direction of movement of said second means between the position in which said second means cannot prevent movement of said movable means and the position in which said second means prevents movement of said movable means.

23. The combination according to claim 17 in which said slidably supporting means include at least two elongated slots in said first means of said locking means and means extending through said slots and secured to said first portion of said second means of said locking means to enable sliding movement of said second means with respect to said first means, and said elongated slots being disposed to control the direction of movement of said second means between the position in which said second means cannot prevent movement of said movable means and the position in which said second means prevents movement of said movable means.

24. The combination according to claim 15 in which said movable means is rotatable in a plane to move said valve element between its first and second positions, and said mounted means of said locking means is movable from a position not in the plane of rotation of said movable means when said valve element is in its first or second position into the plane of rotation of said movable means to be in the single position to prevent movement of said movable means from either of its positions in which said valve element is in its first or second position.

25. The combination according to claim 16 including means to slidably support said second means of said locking means on said first means of said locking means for movement of said second means of said locking means independently of said movable means.

26. The combination according to claim 16 including means to slidably support said second means of said locking means on said first means of said locking means for movement of said second means of said locking means in a direction substantially parallel to the axis of rotation of said movable means.

27. The combination according to claim 18 in which said second portion of said second means of said locking means cooperates only with said movable means to prevent movement of said movable means.

28. The combination according to claim 20 in which said second portion of said second means of said locking means is fixed to said first portion of said second means of said locking means.

* * * * *